US008156837B2

(12) United States Patent
Smith

(10) Patent No.: US 8,156,837 B2
(45) Date of Patent: Apr. 17, 2012

(54) MULTIPLE-RATIO TRANSMISSION WITH CONCENTRIC OFFSET SHIFT FORKS

(75) Inventor: Timothy S. Smith, Mattawan, MI (US)

(73) Assignee: Eaton Corporation, Cleveland, OH (US)

( * ) Notice: Subject to any disclaimer, the term of this patent is extended or adjusted under 35 U.S.C. 154(b) by 513 days.

(21) Appl. No.: 12/404,703

(22) Filed: Mar. 16, 2009

(65) Prior Publication Data

US 2010/0229668 A1    Sep. 16, 2010

(51) Int. Cl.
*F16H 59/00* (2006.01)
*F16H 3/08* (2006.01)

(52) U.S. Cl. .......................... 74/335; 74/330

(58) Field of Classification Search ............. 74/329, 74/330, 335, 340, 473.36, 473.37
See application file for complete search history.

(56) References Cited

U.S. PATENT DOCUMENTS

| | | | |
|---|---|---|---|
| 4,098,146 A | 7/1978 | McLarty | |
| 4,532,823 A | 8/1985 | Razzacki | |
| 5,052,238 A | 10/1991 | Sewell | |
| 5,105,674 A | 4/1992 | Rea et al. | |
| 5,778,728 A * | 7/1998 | Deidewig et al. | 74/473.25 |
| 6,173,624 B1 | 1/2001 | Decker | |
| 6,234,038 B1 | 5/2001 | Loeffler | |
| 7,127,961 B2 * | 10/2006 | Braford et al. | 74/340 |
| 7,210,367 B2 * | 5/2007 | Akutagawa | 74/340 |
| 7,219,571 B2 | 5/2007 | McCrary | |
| 7,437,964 B2 * | 10/2008 | Gitt | 74/330 |
| 7,621,839 B2 * | 11/2009 | Jackson | 475/214 |
| 7,762,154 B2 * | 7/2010 | Murakami et al. | 74/331 |
| 7,845,247 B2 * | 12/2010 | Olds et al. | 74/333 |
| 2005/0223833 A1 | 10/2005 | Ewing et al. | |
| 2006/0101932 A1 | 5/2006 | McCrary | |
| 2007/0199396 A1 * | 8/2007 | Taniai | 74/335 |
| 2008/0184844 A1 | 8/2008 | Mizuno et al. | |
| 2008/0210031 A1 * | 9/2008 | Uberti et al. | 74/335 |

* cited by examiner

*Primary Examiner* — Roger Pang
(74) *Attorney, Agent, or Firm* — Brooks Kushman P.C.

(57) ABSTRACT

A countershaft transmission with positive engagement clutches for changing transmission gearing ratios and shift rails for supporting shift forks in a transmission housing, one shift rail being adapted to support at least two shift forks, whereby an assembly of shift rails is simplified and the transmission housing size is reduced.

20 Claims, 5 Drawing Sheets

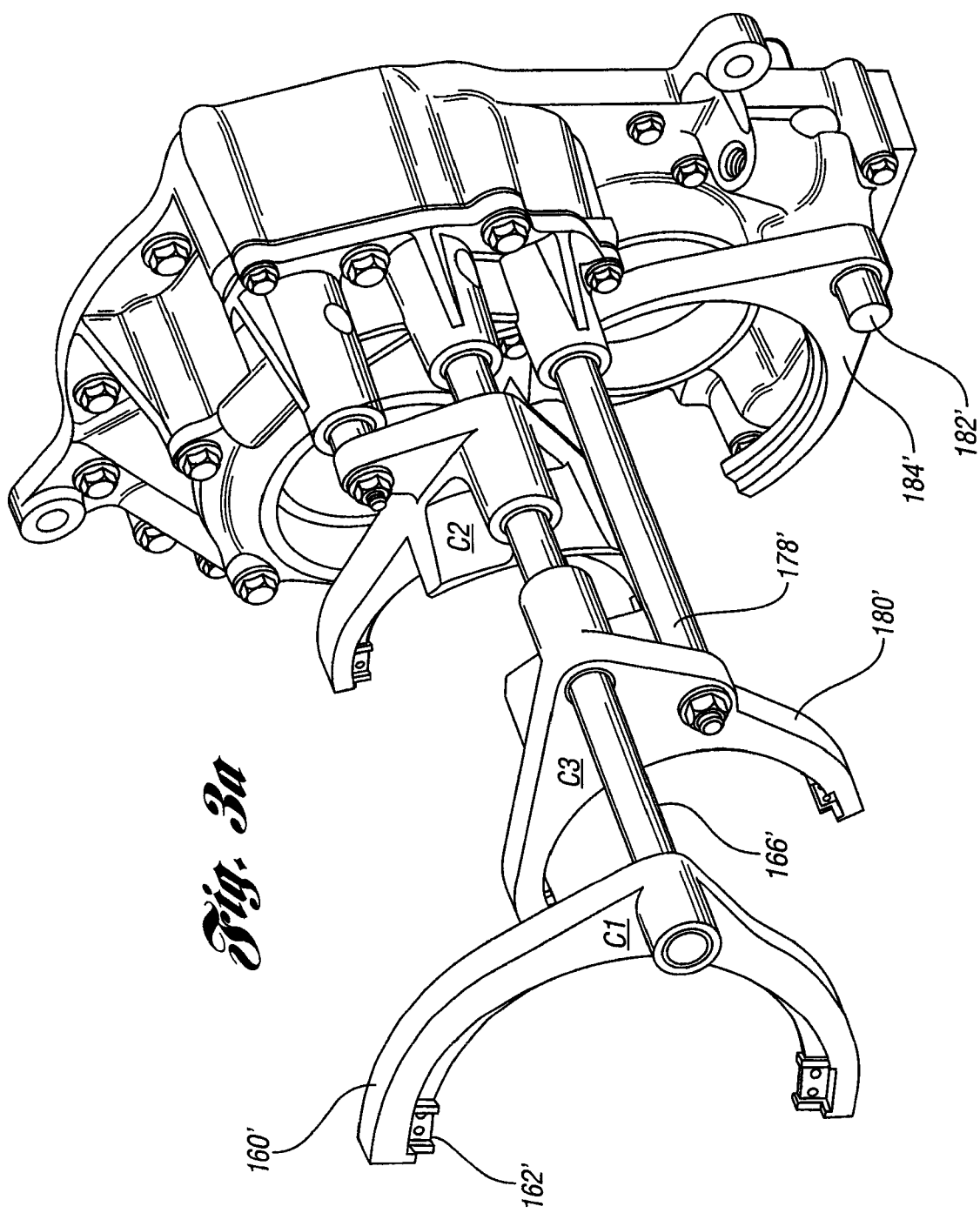

MULTIPLE-RATIO TRANSMISSION WITH CONCENTRIC OFFSET SHIFT FORKS

BACKGROUND OF THE INVENTION

1. Field of the Invention

The invention relates to geared transmissions wherein ratio changes in gearing are effected by ratio change clutches under the control of clutch shift forks carried by shift fork rails.

2. Background Art

A multiple ratio power transmission for motor vehicles typically is classified as either an automatic transmission or a transmission with positive engagement clutches (e.g., synchronizer clutches) for achieving ratio changes in transmission gearing. Automatic transmissions typically include fluid pressure operated clutches and brakes that are selectively engageable under the control of a transmission controller to effect ratio changes in the gearing. A transmission with positive engagement ratio change synchronizer clutches typically include clutch sleeves that are mechanically shifted in the direction of the axes of individual gearing elements in the transmission to establish and disestablish a mechanical connection between the gear elements and a power delivery shaft. The clutch sleeves carry clutch teeth that are selectively engageable with clutch teeth carried by an adjacent gear.

Shift forks carried by shift rails typically are used to shift the clutch sleeves into and out of engagement with clutch teeth carried by the individual gears. Each of the clutch sleeves is slidably connected, usually through spline teeth, to a clutch hub connected to a power delivery shaft on which a gear is mounted.

A shift linkage mechanism actuates the shift rails in the direction of the axis of the power delivery shaft. During a ratio change, a master clutch is disengaged so that a ratio change can occur as the master clutch interrupts torque delivery from the power source, such as an internal combustion engine, to a power output shaft for the transmission.

A transmission with positive engagement ratio change clutches, especially a transmission that has a number of ratio steps, may have a plurality of shift rails, wherein each shift rail actuates a shift fork for a torque delivery gear. In a power transmission mechanism with multiple ratios that require multiple shift rails, packaging of the shift rails within a transmission housing presents a design problem because of the need for space within the transmission housing for accommodating the shift rails. The requirement for increased space, of necessity, increases the size of the transmission housing itself. This may introduce packaging problems for assembling the transmission within the limited space available in an automotive powertrain assembly. Further, an increased size of the housing would increase the weight of the powertrain as well as the manufacturing cost of the powertrain.

Typical examples of automotive transmissions that use positive engagement ratio change clutches may be seen by referring to U.S. patent publication US2008/0188342 and U.S. Pat. No. 5,105,674. The '342 publication, which is assigned to the assignee of the present invention, has multiple shift rails for controlling four positive engagement ratio change clutches. In the case of the design of the '674 patent, a single shift rail can be used, but provision must be made for both angularly adjusting the shift rail about the shift rail axis and for shifting the shift rail in the direction of the shift rail axis to activate multiple shift forks for five forward driving ratios. This complicates the overall design of the gear ratio shifting mechanism of the transmission. Further, a single shift rail design is not readily adaptable for automatic pressure operated shift rail actuators. It is better adapted for use with a gear shift tower having a driver controlled gear shift lever mounted on the transmission housing, whereby the gear shift lever effects both rotary motion and linear motion of the shift rail.

SUMMARY OF AN EMBODIMENT OF THE INVENTION

It is an objective of the invention to reduce complexity of known transmission designs having positive engagement ratio change clutches, such as synchronizer clutches, by reducing the number of elongated shift rails that support ratio-changing shift forks, thereby reducing the complexity of the overall transmission design and reducing the space required for the power transmitting gearing elements within the transmission housing that encloses the gearing elements.

A further objective of the invention is to provide a shift rail construction, wherein the shift rails are adapted for shifting movement in an axial direction using fluid pressure actuators for establishing engagement and disengagement of positive engagement ratio change clutches.

The transmission of the disclosed embodiment of the invention has at least two shift rails that actuate shift forks engageable with positive engagement ratio change clutches for individual gear elements. The clutches include clutch sleeves, such as conventional clutch sleeves in a known synchronizer clutch design, which are engaged by the shift forks carried by the shift rails. One of the shift rails shifts one shift fork that is slidably mounted on a second shift rail. A second shift fork is fixed to the second shift rail. A first actuator includes a pressure operated element that actuates the one shift rail to engage and disengage one of the positive engagement ratio change clutches. A second actuator includes a second pressure operated element for actuating the second shift rail to effect shifting movement of the second shift fork. A third shift rail and a third actuator can be used to shift a third shift fork for a third positive engagement ratio change clutch if the gearing requires a third shift fork. A reduced number of elongated shift rails thus is required. A fourth shift rail and a fourth actuator for the fourth shift rail also may be included in the transmission.

According to another feature of the invention, the third shift fork can be slidably mounted on the second shift rail and shifted by the third shift rail, thereby further simplifying the design and eliminating the need for still another elongated shift rail.

BRIEF DESCRIPTION OF THE DRAWINGS

FIG. 3a is an isometric schematic illustration of a shift rail assembly with three concentric yokes for the multiple-ratio gearing of FIG. 1.

PARTICULAR DESCRIPTION OF THE DISCLOSED EMBODIMENT

Figure 1:
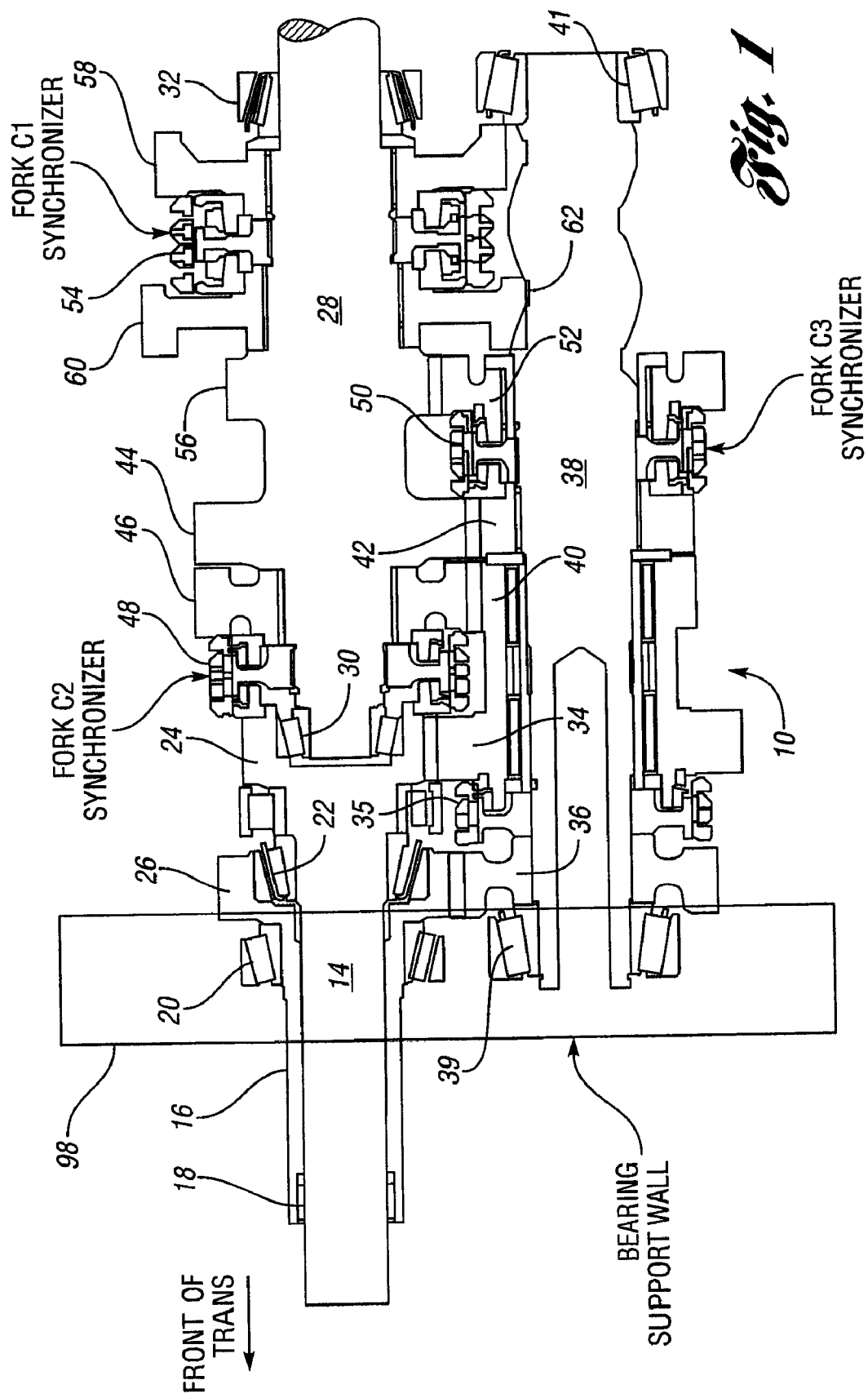
FIG. 1 is a schematic cross-sectional view of a transmission for use with a dual master clutch assembly, wherein positive engagement synchronizer clutches are adapted to be used with a shift rail assembly, ratio change clutches being engaged and released in a five speed ratio pattern.
Figure 4:
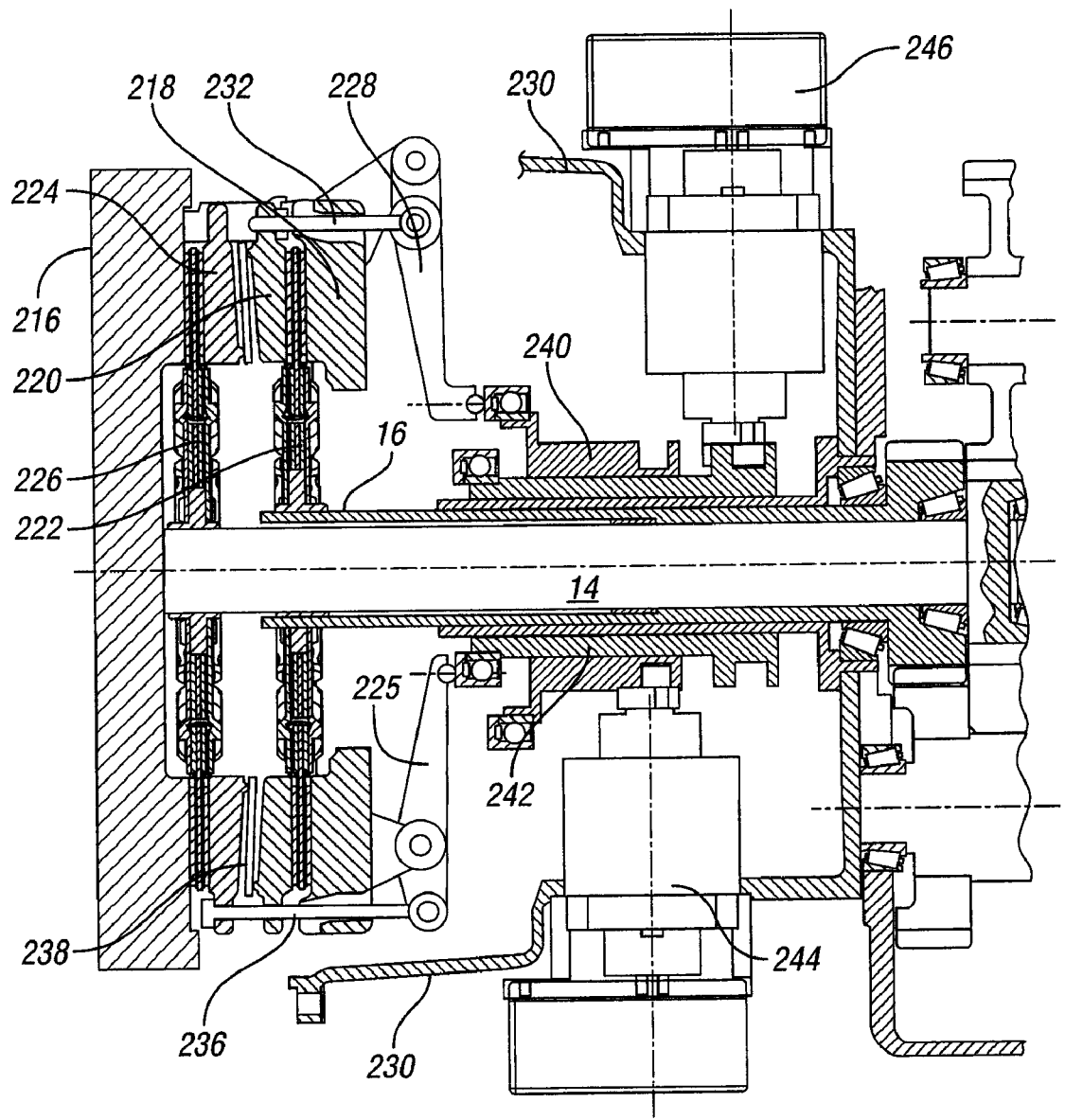
FIG. 4 is a partial cross-sectional view in schematic form of a dual master clutch assembly for the gearing of FIG. 1.

In the disclosed embodiments of the invention of FIG. 1, the dual clutches of FIG. 4 between the torque input elements of the multiple ratio transmission and the engine can be selectively engaged and disengaged so that each gear ratio in the overall speed ratio range can be preselected as power is transferred through the powertrain with an adjacent overall ratio. This pre-selection is achieved for power shifts between ratios. Torque interruption is avoided during transitions between the ratios.

The embodiment of the invention illustrated in FIG. 1 comprises a multiple-speed, dual clutch transmission, generally indicated at 10. Transmission 10 has a first torque input shaft 14 and a second torque input shaft 16. Input shaft 16 is a sleeve shaft that surrounds input shaft 14. Sleeve shaft 16 is journaled by bearing 20 in a transmission housing. Shaft 14 is journaled within sleeve shaft 16 by tapered roller bearing 22.

Shaft 14 is connected to a first transmission torque input gear 24 and sleeve shaft 16 is connected to second transmission torque input gear 26.

A transmission mainshaft 28 is aligned with the torque input shafts and is journaled at 30 within a bearing opening in torque input gear 24. The right-hand end of mainshaft 28 is journaled by bearing 32 in the transmission housing so that the mainshaft 28 is end supported.

Torque input gears 24 and 26 are commonly referred to as headset gears. Gear 24 meshes with countershaft gear 34, and gear 26 meshes with countershaft gear 36. Gear 34 may have a larger pitch diameter than gear 36, but the relative pitch diameters could be different depending on the gear ratios of the mainshaft gears.

Countershaft gear 36 is keyed or splined to countershaft 38, which is end-supported by tapered roller bearing 39 at its left end and by tapered roller bearing 41 at its right end. Bearings 39 and 41 are situated in bearing openings formed in the transmission housing. Countershaft gears 34 and 40 are rotatably journaled on countershaft 38. They define a countershaft sleeve.

A transmission bearing support wall 98 for the transmission housing is secured to an engine block for a vehicle engine. Both input shafts 14 and 16 are drivably connected to the crankshaft of an internal combustion engine by the dual clutches seen in FIG. 4. Input shaft 16 is connected drivably to the first headset gear 26 and input shaft 14 is connected drivably to the second headset gear 24, which has a smaller pitch diameter than headset gear 26.

Headset gear 26 is journaled in a bearing opening in the bearing support wall 98, as shown at 20. One end of the sleeve shaft 16 is journaled by bearing 18 for rotation about the input shaft 14. Bearing 22 rotatably supports headset gear 24 and input shaft 14.

The dual clutch assembly of FIG. 4 alternately connects an engine crankshaft, not shown, to the sleeve shaft 16 for headset gear 26 and to input shaft 14, which is formed integrally with headset gear 24. When the dual clutch assembly connects headset gear 24 to the engine crankshaft for low transmission ratio operation, headset gear 26 is disconnected from the engine crankshaft. As a ratio shift occurs from low transmission ratio to the next higher or first gear ratio, the clutch assembly connects the gear 26 to the engine crankshaft and disconnects gear 24 from the engine crankshaft.

Countershaft 38 is end supported by bearing 39 in the bearing support wall 98 and by bearing 41 in the transmission housing. Headset gear 26 drivably engages countershaft gear 36, which is fixed to the countershaft 38.

A fourth countershaft gear 42 engages mainshaft gear 44, which is connected to or formed integrally with mainshaft 28. Mainshaft gear 46 is journaled on the mainshaft 28 and is drivably coupled to the mainshaft by synchronizer clutch sleeve 48 when the sleeve is shifted in a right-hand direction.

When the synchronizer clutch sleeve 48 is shifted to the left, gear 24 becomes drivably connected to mainshaft 28. Synchronizer clutch sleeve 48 has internal teeth that drivably engage external synchronizer clutch teeth carried by mainshaft gear 46, and by external synchronizer clutch teeth carried by gear 24. As will be explained subsequently, the synchronizer clutch sleeves have annular grooves that are engaged by shift fork pads on the shift forks, which are mounted on shift rails, not shown in FIG. 1. This will be described with reference to FIG. 3. When the synchronizer clutch sleeve 48 is shifted in the left-hand direction, the transmission mechanism is conditioned for fourth speed ratio operation as shafts 14 and 28 are connected.

The countershaft assembly has a synchronizer clutch with clutch sleeve 50 secured to countershaft 38. When the synchronizer clutch sleeve 50 is shifted by a shift fork in a left-hand direction, countershaft gear 42 becomes connected to countershaft 38. When sleeve 50 is shifted in a right-hand direction, countershaft gear 52 becomes connected to countershaft 38 to establish fifth ratio operation. Gear 52 engages mainshaft gear 56, which is fixed to mainshaft 28.

Mainshaft 28 is journaled in headset gear 24 by bearing 30. Mainshaft gear 46 is journaled on the mainshaft and is connected to the mainshaft by synchronizer clutch sleeve 48 when the clutch sleeve 48 is shifted in a right-hand direction to establish second speed ratio operation.

A second mainshaft synchronizer clutch sleeve 54 is located between mainshaft gears 58 and 60. When the synchronizer clutch sleeve 54 is shifted in a left-hand direction, clutch teeth on gear 60 are engaged to establish a driving connection between gear 60 and the mainshaft 28. This occurs during low and first speed ratio operation. When the sleeve 54 is shifted in a right-hand direction, mainshaft gear 58 is connected directly to mainshaft 28 for reverse operation.

The mainshaft 28 is drivably connected to a transmission power output shaft at the right-hand end of the mainshaft as viewed from the perspective of FIG. 1. Reverse mainshaft gear 58 is drivably engaged with a reverse idler, not shown.

Engine torque is delivered to input shaft 14 during low speed ratio, during the second speed ratio and during the fourth speed ratio. The input shaft 16 receives engine torque from the dual clutch assembly during operation of the transmission in the first speed ratio, the third speed ratio and the fifth speed ratio. The torque flow path in the low speed ratio includes the headset gear 24, countershaft gears 34 and 62 and mainshaft gear 60, which is clutched to the mainshaft through synchronizer clutch sleeve 54. Synchronizer clutch sleeve 35 clutches countershaft gear 34 at this time to countershaft 38 to pre-select first speed ratio. First speed ratio is established as torque is delivered through the dual clutch assembly to shaft 16. As a shift occurs to the first speed ratio, the second speed ratio synchronizer clutch is pre-selected by shifting the synchronizer clutch sleeve 48 in a right-hand direction. When the dual clutch assembly transfers torque delivery from input shaft 16 to sleeve shaft 14, second ratio operation then is established. At that time, torque delivery shift to the third ratio is pre-selected. This is done by shifting synchronizer clutch sleeve 50 in a left-hand direction. When the dual clutch assembly transfers torque delivery from shaft 14 to the shaft 16, third speed ratio is established. At that time, the fourth speed ratio is pre-selected by shifting synchronizer clutch sleeve 48 in a left-hand direction. Thus, when torque delivery to the input shafts 14 and 16 is reversed, shafts 14 and 28 are connected and the fourth speed ratio is established as the third speed ratio is disestablished. To establish the fifth speed ratio, synchronizer clutch sleeve 50 is shifted in a right-hand direction. The fifth ratio was pre-selected as the fourth ratio was established.

To achieve reverse drive operation, torque is delivered to the torque input sleeve shaft 16, and synchronizer clutch sleeve 54 is shifted in a right-hand direction to drivably connect reverse gear 58 to mainshaft 28. Reverse gear 58 is driven by a reverse idler, not shown.

Figure 2:
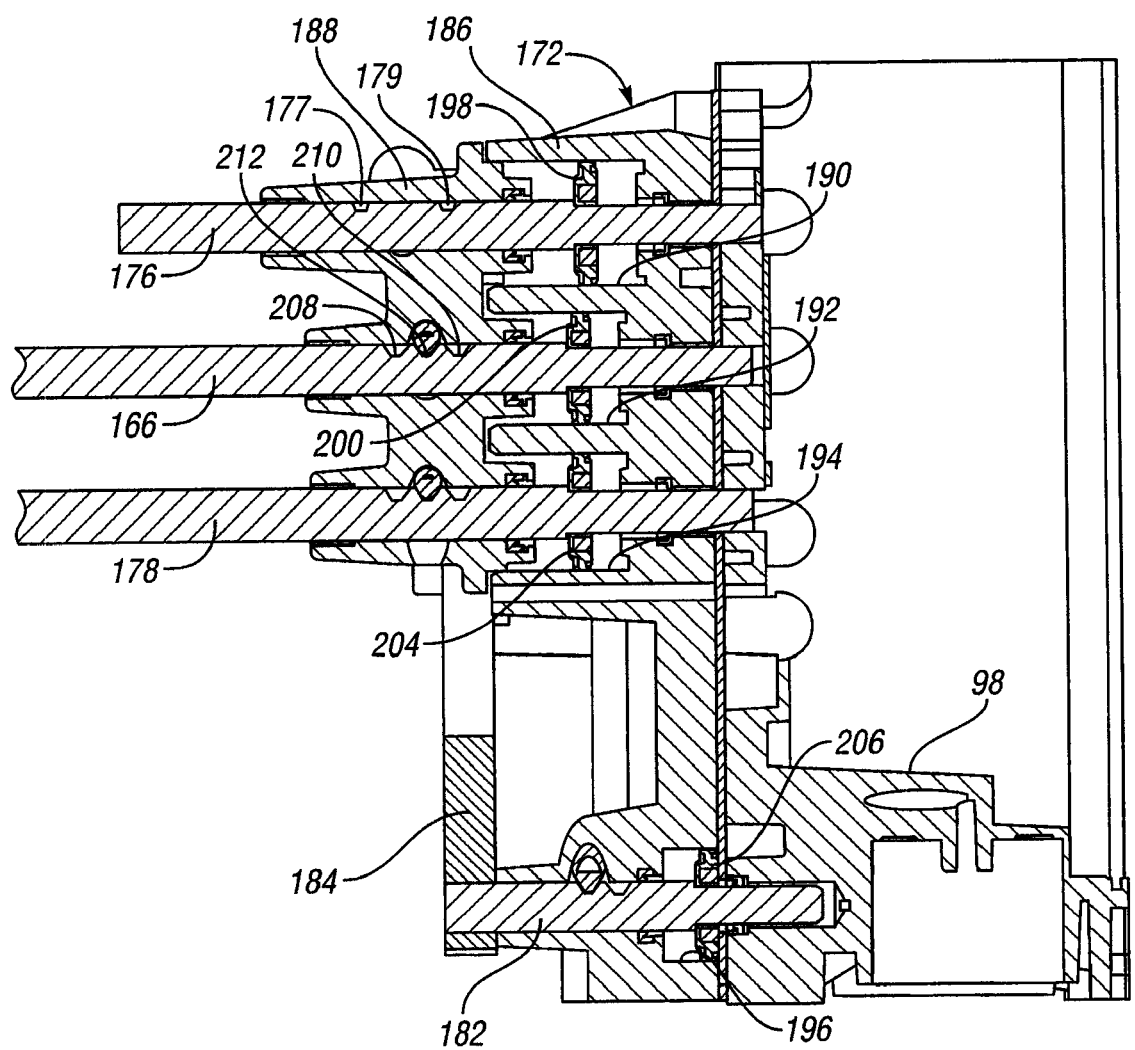
FIG. 2 is a partial schematic cross-sectional view showing the actuators for the shift rails of the invention.
Figure 3:
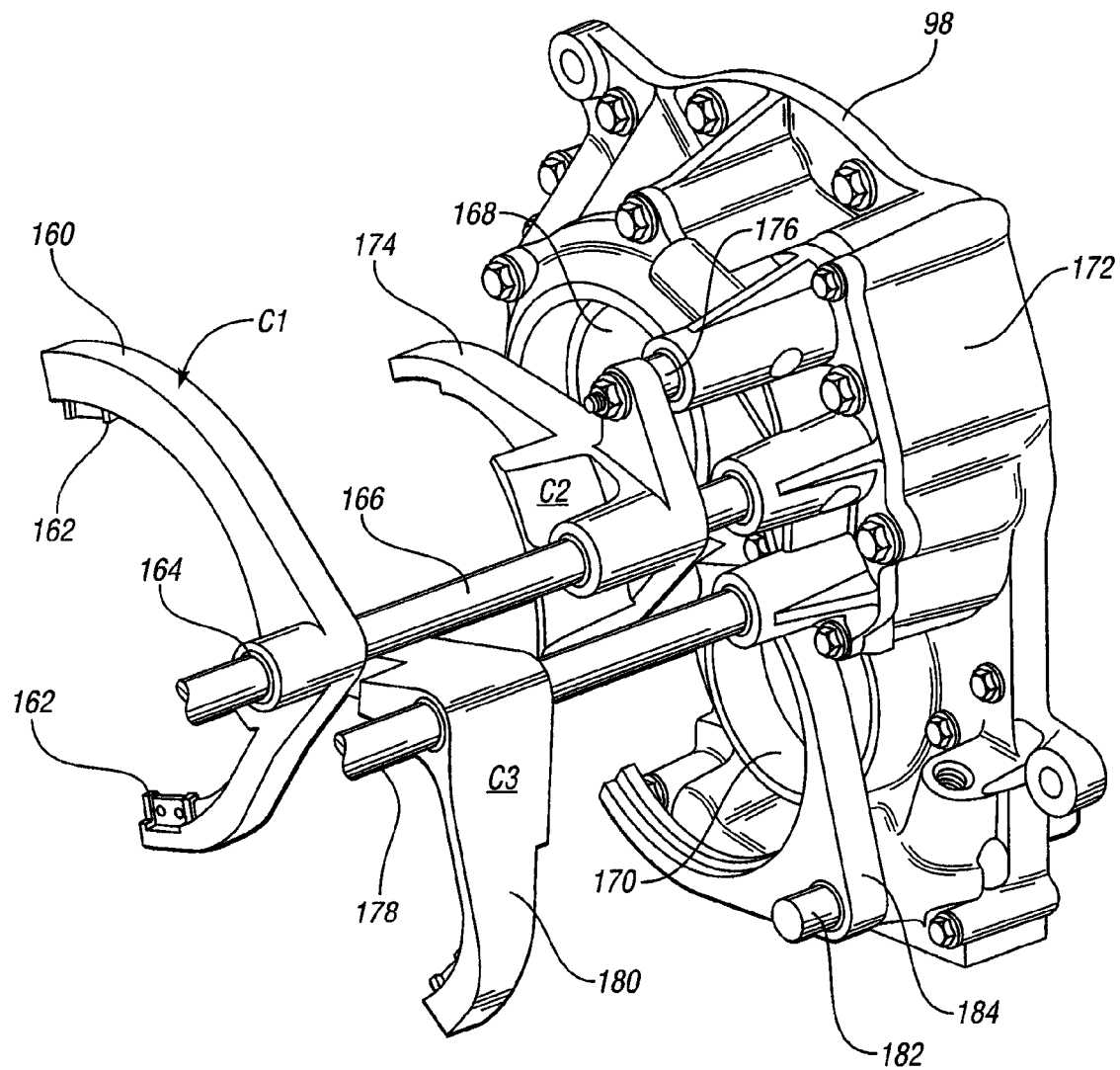
FIG. 3 is an isometric schematic illustration of a shift rail assembly with two concentric yokes for the multiple-ratio gearing of FIG. 1.

FIG. 3 shows the shift forks and the shift rails that carry the shift forks for achieving the ratio changes previously described. The shift fork 160 (C1) for shifting synchronizer clutch sleeve 54 is shown in FIG. 2 at 160. Shift fork 160 (C1) carries shift fork pads 162, which enter a peripheral groove of the shift fork sleeve 54 seen in FIG. 1. Shift fork 160 is secured at 164 to shift rail 166, which extends parallel to the axis of mainshaft 130.

The input shafts 14 and 16 are journaled in a bearing opening in the support wall 98, seen schematically in FIG. 1. Support wall 98 includes an actuator housing seen at 172 in FIGS. 2 and 3, support wall 98 forms an interface between the transmission housing and the engine. The countershaft 38 is journaled within countershaft bearing opening 170 in the actuator housing 172, as seen in FIG. 3. The mainshaft is journaled in bearing opening 168.

Shift rail 166, seen in FIG. 3, extends within shift rail support wall 172, which forms a part of the bearing support wall 98. Shift actuators, which will be described with reference to FIG. 2, are shiftable to effect reverse drive operation and forward drive operation, as previously explained.

A shift fork 174 (C2) is slidably mounted on shift rail 166. It is actuated by an offset, shortened shift rail 176, which extends into the actuator housing 172. Shift rail 176 is fixed to the shift fork 174, which in turn is slidably supported on shift rail 166 by a bushing. Shift fork 174, like shift fork 160, has pads at the fork ends, which enter a peripheral groove in synchronizer clutch sleeve 48, seen in FIG. 1.

A shift rail 178 carries a shift fork 180 (C3). Shift rail 178 is slidably supported by the actuator housing 172 for shifting movement in the direction of the axis of countershaft 38. Shift fork 180 (C3) is fixed to the shift rail 178 and carries shift fork pads (not shown) that enter a peripheral groove in synchronizer clutch sleeve 50.

A fourth shift rail 182 is mounted for shifting movement at an offset location in the actuator housing 172. Shift rail 182 is fixed to shift fork 184, which has actuator pads (not shown) received within a peripheral groove in synchronizer clutch sleeve 35, seen in FIG. 1.

As seen in FIG. 2, actuator housing 172 includes a first portion 186 and a second portion 188. Housing portion 186 slidably supports shift rail 176, shift rail 166, shift rail 178 and shift rail 182. Housing portion 186 has four shift rail actuator cylinders 190, 192, 194 and 196. Each cylinder receives an actuator piston as shown at 198, 200, 204 and 206, respectively.

Actuator housing portion 188 has yieldable detent elements that enter detent notches in the shift rails, thereby defining the operating positions for each shift rail. Operating positions for shift rail 176, for example, correspond to the notches shown at 177 and 179. Likewise, shift rail 166 has operating positions defined by notches 208, 212 and 210. The shift rails of the present invention are shifted to their operating positions by controlling pressure differential across actuator pistons 198, 200, 204 and 206.

In the case of shift rail 166, the reverse operating position corresponds to notch 210 and the first ratio operating position corresponds to notch 208. The neutral position for shift rail 166 corresponds to notch 212 located between notches 208 and 210. The detent notches for the shift rails are engaged by flexible detent elements, which establish the operating positions for each shift rail.

The shift rail assembly of the invention simplifies the overall shift rail assembly by using reduced number of elongated shift rails. This is achieved by slidably mounting at least one of the shift forks on a shift rail that is used to actuate a second shift fork. Further, in the case of an alternate embodiment of the invention, seen in FIG. 3a, it is possible to eliminate still another elongated shift rail by slidably mounting shift fork 180 on shift rail 166 and actuating shift fork 180 using shift rail 178. This might be feasible depending upon the gearing configuration of the transmission with which the shift rail assembly would be used. In FIG. 3a, elements of the shift rail and shift fork assembly that have corresponding elements in the assembly of FIG. 3 have been identified by the same numerals seen in FIG. 3, although prime notations are added.

In FIG. 3a, shift fork 180' (C3) has a yoke that is slidably mounted on shift rail 166', which is secured to shift fork 162 (C1). Shift rail 178' actuates shift fork 180'. Thus, a single shift rail 166' will support three concentric shift forks. Only one elongated shift rail then is needed to achieve the shift functions available with the embodiment of FIG. 3. The other shift rails are short.

Shift rail 182 actuates a shift fork to shift synchronizer clutch sleeve 35, seen in FIG. 1, to selectively lock countershaft gear 34 to countershaft 38.

The simplified shift rail assembly of the invention reduces the space required to accommodate the shift rail assembly within the transmission housing. It also reduces the size of the transmission housing, which in turn reduces the weight of the transmission and the complexity of the overall powertrain design.

An example of a dual clutch assembly that may be used to deliver engine torque to headset gears 104 and 106 is illustrated in FIG. 4. It is enclosed in a forward portion of transmission housing 230. A portion of an engine flywheel is shown in FIG. 4 at 216. A friction clutch cover 218 forms a part of the engine flywheel and is connected to flywheel portion 216. A clutch pressure plate at 220 is slidably secured at its outer periphery to the clutch housing, and a friction disk assembly 222, which is connected to input shaft 16, is located between pressure plate 220 and clutch cover 218. A pressure plate 224 is also slidably secured at its outer margin to clutch cover 218. A second friction disk assembly 226, which is connected to input shaft 14, is situated between clutch pressure plate 224 and flywheel portion 216. An actuator lever 228 is pivoted on clutch cover 218. When it is pivoted clockwise, a clutch actuator rod 232 engages plate 220. This causes plate 224 to frictionally engage disk assembly 226, thereby creating a mechanical connection between flywheel portion 216 and input shaft 14.

A second actuator lever 225 is pivoted on the clutch cover 218. A second actuator rod 236, when it pivots in a counterclockwise direction, pulls plate 224 to compress a Belleville spring 238 thereby establishing a frictional driving connection between friction disk assembly 222 and clutch cover 218. Friction disk assembly 222 is connected to input shaft 16. The plates 224 and 220 are separated by Belleville spring 238, as shown, so that a clutch engaging force on one plate is transferred to the other plate.

Friction disk assembly 226 is engaged as lever 228 is pivoted in the clockwise direction, and friction disk assembly 222 is engaged when lever 225 is pivoted in a counterclockwise direction as viewed in FIG. 4. The clutch friction disk assemblies may have multiple actuator levers for both engagement and disengagement. Each actuator lever 228 is pivoted with clockwise movement by clutch sleeve 240, which engages the operating end of levers 228. Each actuator lever 225 is pivoted with counterclockwise movement by clutch sleeve 242.

Clutch sleeve 242, which is concentrically disposed within sleeve 240, engages the operating ends of levers 225 when it is shifted in a left-hand direction, as viewed in FIG. 4. The sleeve 240 has a first actuator motor generally shown at 244, which is mechanically connected to sleeve 240. A second actuator motor 246 is mechanically connected to sleeve 242. Motors 244 and 246 may be electric stepper motors. As the sleeve 240 is shifted by motor 246 in a left-hand direction, actuator levers 228 rotate in the clockwise direction to engage friction disk assembly 226 and to release friction disk assembly 222. When motor 246 is actuated, a mechanical connection between motor 246 and sleeve 242 moves levers 225 in a counterclockwise direction thereby releasing friction disk assembly 226 and engaging friction disk assembly 222.

Although an embodiment of the invention is disclosed, modifications may be made by persons skilled in the art without departing from the scope of the invention. All such modifications and equivalents thereof are intended to be covered by the following claims.

What is claimed is:

1. A multiple-ratio transmission in a vehicle powertrain comprising gearing including gear elements mounted on a transmission mainshaft and on a transmission countershaft;
    an assembly of shift rails having at least one long shift rail, each of the shift rails of the assembly of shift rails being parallel to a longitudinal axis of the transmission mainshaft;
    a first positive engagement clutch adjacent a first gear element and a second positive engagement clutch adjacent a second gear element;
    a first shift fork adapted to shift the clutch for the first gear element into and out of engagement;
    a second shift fork adapted to shift a clutch for the second gear element into and out of engagement;
    the first shift fork being fixed to the long shift rail and the second shift fork being slidably supported on the long shift rail;
    an actuator for each shift rail, each actuator being adapted to selectively shift at least one of the shift rails in a longitudinal direction parallel to the mainshaft axis; and
    a support wall adapted to support the mainshaft and countershaft therethrough, each of the shift rails of the assembly of shift rails slidably supported by the support wall.

2. The multiple-ratio transmission set forth in claim 1 wherein the actuator is a pressure operated piston, being mechanically connected to each shift rail, whereby each shift rail is shifted in the longitudinal direction of the mainshaft axis along the long shift rail.

3. The multiple-ratio transmission set forth in claim 1 wherein the assembly of shift rails further comprises and at least one shortened shift rail for actuating the second slidably supported shift fork, the shortened shift rail is of reduced length compared to the long shift rail thereby reducing space within the transmission and reducing the weight of the transmission.

4. The multiple-ratio transmission set forth in claim 1 wherein the mainshaft is a part of a transmission power output shaft.

5. The multiple-ratio transmission set forth in claim 1 wherein the support wall further comprises an actuator housing portion having detent elements to engage a plurality of notches formed along the shift rails, the detents engaging the notches to establish a plurality of operating positions for each shift rail.

6. A multiple-ratio transmission in a vehicle powertrain comprising gearing including gear elements mounted on a transmission mainshaft and on a transmission countershaft;
    two transmission power input shafts;
    the gearing comprising two headset gears mounted for rotation about a longitudinal axis of the mainshaft;
    one headset gear being connected to one power input shaft and the other headset gear being connected to the other power input shaft;
    an assembly of at least two shift rails, the assembly having at least one elongate shift rail and at least one shortened shift rail;
    a first positive engagement clutch adjacent a first gear element and a second positive engagement clutch adjacent a second gear element;
    a first shift fork being adapted to shift the clutch for the first gear element into and out of engagement; and
    a second shift fork being adapted to shift the clutch for the second gear element into and out of engagement;
    one of the first and second shift forks being fixed to the elongate shift rail and being actuated with the elongate shift rail, the other of the first and second shift forks being slidably supported on the elongate shift rail and being actuated by the shortened shift rail,
    wherein the shortened shift rail is of reduced length compared to the elongate shift rail thereby reducing space within the transmission and reducing the weight of the transmission.

7. The multiple-ratio transmission set forth in claim 6 wherein one transmission power input shaft is concentrically disposed about the other.

8. The multiple ratio transmission set forth in claim 6 wherein each of the two power input shafts is selectively connected to a separate one of the two headset gears.

9. The multiple-ratio transmission set forth in claim 6 wherein the two power input shafts are selectively and drivably connected respectively to a first and a second friction clutch of a dual power input clutch assembly.

10. The multiple-ratio transmission set forth in claim 9 wherein the first and second friction clutches are selectively and alternately connected, respectively, to the one headset gear and to the other headset gear.

11. The multiple-ratio transmission set forth in claim 6 further comprising a support wall adapted to support the mainshaft and countershaft therethrough, the assembly of shift rails slidably supported by the support wall.

12. The multiple-ratio transmission set forth in claim 6 wherein each of the shift rails of the assembly of shift rails is parallel to a longitudinal axis of the transmission mainshaft, the transmission further comprising an actuator for each shift rail, each actuator being adapted to selectively shift at least one of the shift rails in a longitudinal direction of the mainshaft axis.

13. The multiple-ratio transmission set forth in claim 12 wherein the actuators comprise a pressure operated piston being mechanically connected to each of the shift rails, whereby each of the shift rails is shifted in the longitudinal direction of the mainshaft axis along the elongate shift rail.

14. The multiple-ratio transmission set forth in claim 6 further comprising a support wall adapted to support the mainshaft and countershaft therethrough, the assembly of shift rails slidably supported by the support wall.

15. A multiple-ratio transmission in a vehicle powertrain comprising gearing including gear elements mounted on a transmission mainshaft and on a transmission countershaft;
two transmission power input shafts;
the gearing comprising two headset gears mounted for rotation about a longitudinal axis of the mainshaft;
one headset gear being connected to one power input shaft and the other headset gear being connected to the other power input shaft;
an assembly of at least three shift rails the assembly having at least one elongate shift rail and at least two shortened shift rails;
three shift forks supported on the shift rails, one of the three shift forks being fixed to the elongate shift rail and actuated with the elongate shift rail, and the other of the three forks being slidably supported on the elongate shift rail and actuated by the at least two shortened shift rails respectively; and
a first positive engagement clutch adjacent a first gear element and a second positive engagement clutch adjacent a second gear element;
the three shift forks being adapted to shift the clutch for the first gear element into and out of engagement, the clutch for the second gear element into and out of engagement and the clutch for a third gear element into and out of engagement respectively,
wherein the at least two shortened shift rails are of reduced length compared to the elongate shift rail, thereby reducing space within the transmission and reducing the weight of the transmission.

16. The multiple-ratio transmission set forth in claim 15 wherein one transmission power input shaft is concentrically disposed about the other.

17. The multiple ratio transmission set forth in claim 15 wherein each of the two power input shafts is selectively connected to a separate one of the two headset gears.

18. The multiple-ratio transmission set forth in claim 15 wherein the one power input shaft and the other power input shaft are selectively and drivably connected respectively to a first and a second friction clutch of a dual power input clutch assembly.

19. The multiple-ratio transmission set forth in claim 18 wherein the first and second friction clutches are selectively and alternately connected, respectively, to the one headset gear and to the other headset gear.

20. The multiple-ratio transmission set forth in claim 15 further comprising a support wall adapted to support the mainshaft and countershaft therethrough, the assembly of shift rails slidably supported by the support wall.

* * * * *